United States Patent [19]

Lawford

[11] Patent Number: 4,829,825
[45] Date of Patent: May 16, 1989

[54] MULTIPLE DIAPHRAGM PROBE SEAL

[75] Inventor: Victor N. Lawford, Glendora, Calif.

[73] Assignee: ITT Corporation, New York, N.Y.

[21] Appl. No.: 111,850

[22] Filed: Oct. 19, 1987

[51] Int. Cl.$^4$ .......................... G01L 7/08; G01L 9/08; G01L 13/06
[52] U.S. Cl. ........................................ 73/706; 73/716; 73/717; 73/729; 73/754; 73/861.24
[58] Field of Search .................... 73/706, 716, 861.24, 73/861.22, 188, 189, 182, 717, 718, 719, 720, 721, 722, 729, 731, DIG. 4, 754

[56] References Cited

U.S. PATENT DOCUMENTS

| 2,315,756 | 4/1943 | Warner | 73/182 |
| 4,085,614 | 4/1978 | Curran et al. | 73/861.24 |
| 4,262,532 | 4/1981 | Butler et al. | 73/717 |
| 4,402,226 | 9/1983 | Perkins et al. | 73/729 |
| 4,694,702 | 9/1987 | Amemori et al. | 73/861.24 |

Primary Examiner—Donald O. Woodiel
Attorney, Agent, or Firm—Menotti J. Lombardi

[57] ABSTRACT

An improved diaphragm probe comprising a plate having a portion removed to form one or more cavities. At least two diaphragm strips sealed to close off each of the external openings of each of said one or more cavities. An incompressible fluid filling each cavity. A pressure sensitive instrument and means to transmit pressure changes at the diaphragms to said instrument in order to maximize the active diaphragm area with relation to the entry dimensions of the probe into a conduit.

6 Claims, 2 Drawing Sheets

U.S. Patent  May 16, 1989  Sheet 1 of 2  4,829,825
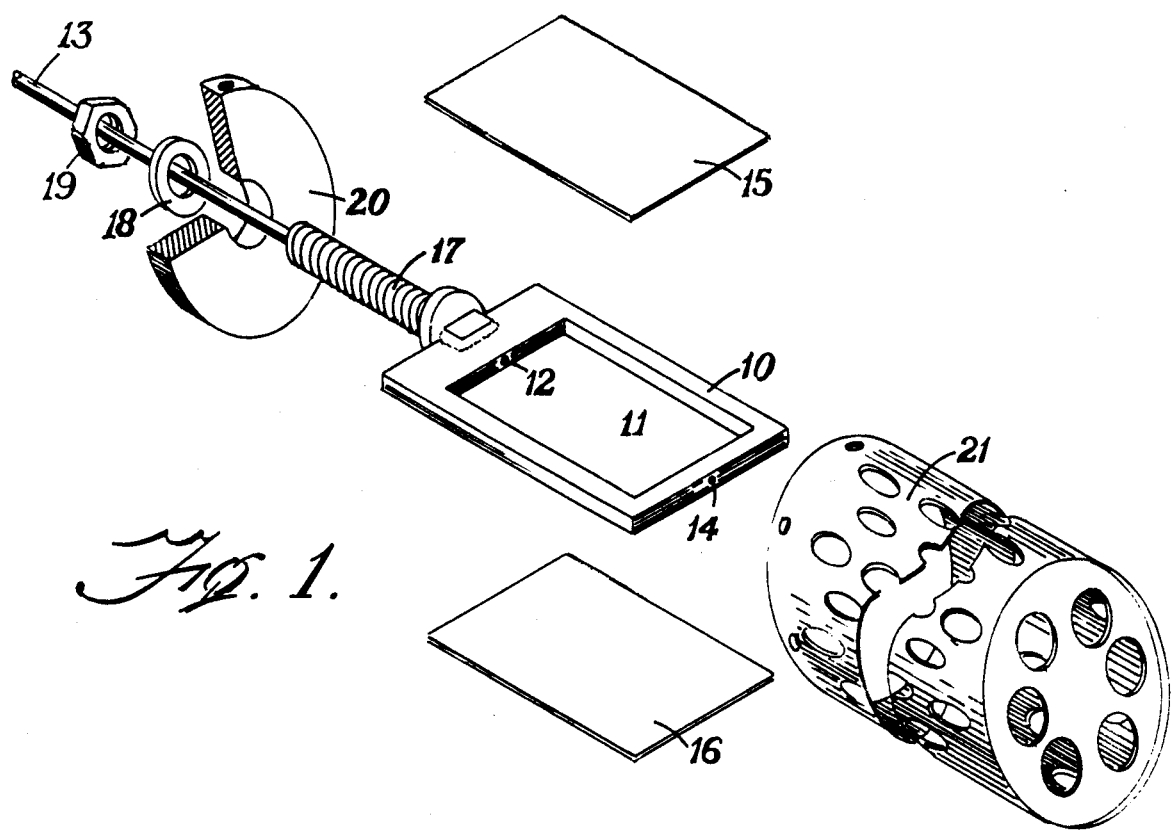
Fig. 1.
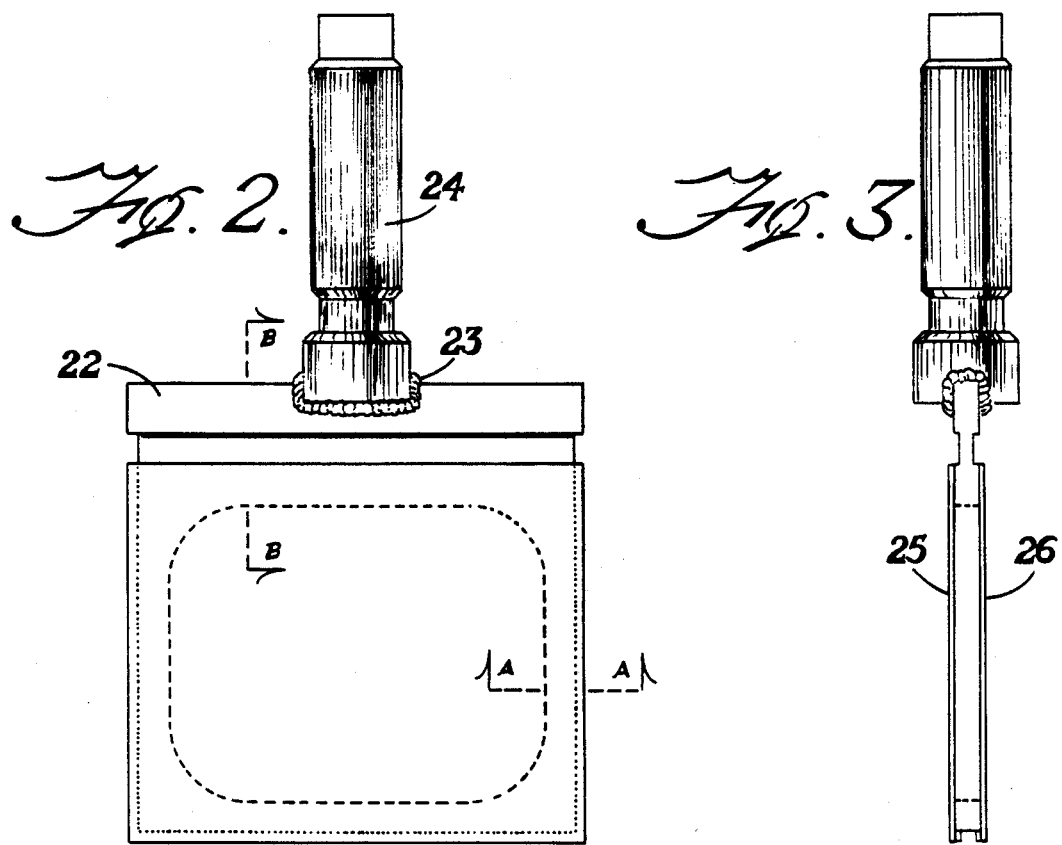
Fig. 2.
Fig. 3.

MULTIPLE DIAPHRAGM PROBE SEAL

BACKGROUND OF THE INVENTION

Prior art employs round diaphragms of thin material used to isolate pressure instruments from harmful conditions. The diaphragm becomes a mechanical barrier between the process fluids and a liquid which transmits the pressure to the pressure instrument. The diaphragm must have flexibility to displace sufficient fill liquid to allow the instrument to perform its pressure measurement function and should not impose a detrimental pressure drop during the displacement. Shortcomings of such an instrument are that the diaphragm size places limitations on the instrument sensitivity. The thickness of diaphragm materials such as metal foil and the volumetric displacement versus pressure loss also. present disadvantages. Round diaphragms are mostly used with pressure gauges such as bourdon tube types that have very small volumetric displacements. For example, a diaphragm of 1.4 inches diameter 0.003 inches thick with a volumetric displacement of 0.025 cubic inches will easily operate bourdon gauges or force balance instruments or other similar devices. But for instruments that utilize bellows to measure pressures, flows or tank levels the displacement requirements necessitate large diaphragms such as 4 inches in diameter and for installation the large diaphragm requires large flanges or apertures in process vessels or piping.

The present invention overcomes the size displacement limitations of the round metal diaphragm. A new rectangular design or at least oval can have the installation dimensions of a small round diaphragm with the volumetric displacements of a large round diaphragm. Also the design has capabilities of various displacements. The probe aspect of the seal also provides deeper penetration into a vessel preventing build up a contaminants on flush diaphragms.

SUMMARY OF THE INVENTION

Accordingly, it is one object of this invention to overcome the size displacement limitations of round metal diaphragms.

Another object of the invention is to provide a probe employing at least two diaphragm strips closing off one or more cavities.

Still another object of the invention is to provide such a probe in which a rectangular plate has two portions relieved to form two opposing cavities with a dividing wall therebetween and a diaphragm closing off each of such cavities for use with a differential pressure measuring instrument.

These and other objects are achieved by providing a diaphragm probe having a plate with a portion removed to form one or more cavities with at least two diaphragm strips sealed to close off each of the external openings of each of said one or more cavities and an incompressible fluid filling each cavity. A pressure sensitive instrument is employed with means to transmit pressure changes at the diaphragms to said instrument. This is done in order to maximize sensitivity by increasing the active diaphragm area with relation to the entry dimensions of the probe into a conduit or vessel.

The novel features which are believed to be characteristic of the invention are set forth with particularity in the appended claims. The invention and further objects and advantages thereof can best be understood by reference to the following description and accompanying drawings.

BRIEF DESCRIPTION OF THE DRAWINGS

FIG. 1 is an exploded view of the diaphragm probe of the invention;

FIG. 2 is a front view showing the construction of such a probe;

FIG. 3 is a side view of the probe of FIG. 2;

DESCRIPTION OF THE PREFERRED EMBODIMENT

Figure 4:
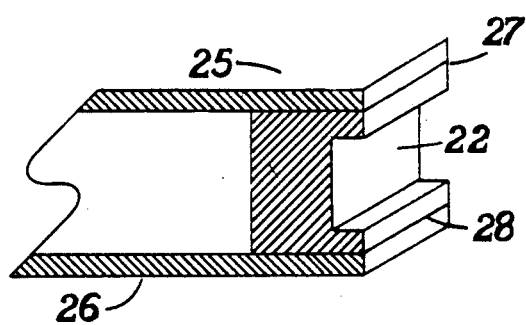
FIG. 4 is a section taken along the line AA of FIG. 2 to illustrate the welding technique to attach the diaphragm.

In FIG. 1 a probe plate 10 of metal and rectangular shape may be approximately an ⅛" thick. The center portion 11 is removed. A hole 12 is drilled at one end for joining with capillary tubing 13. An additional vent hole 14 is optional and may be used for filling the cavity 11.

Two flat metal diaphragms strips 15 and 16 are attached to the probe plate in a manner to cover the cavity 11. When the cavity is filled with liquid and connected to the instrument by means of the capillary tubing 13, pressure signals applied to the diaphragms are transmitted to the instrument. The length of the diaphragms in the probe can be varied to achieve ample volumetric displacements. As shown the quantity of diaphragms are two. However, it is obvious that a multiplicity of diaphragms could be employed and the diaphragms may be contoured to eliminate stress points and corrugations may b formed to increase flexibility. Joining the diaphragms to the probe should be by hermetic seal quality, welding preferred. For replacement purposes diaphragms may be mounted on elastomer or gasket seals with screwed mounting strips.

An adaptor 17 is a connector joining the probe plate to the capillary tubing, a through hole allowing the fill liquid to enter the probe. With washer 18 and nut 19 top plate 20 provides an installation method to hold the probe assembly in a stable fixed position. A cover 21 may be used to protect the diaphragms from damage and may be made from perforated or expandable metal for free flow of contaminants.

Applications for the probe may be in tank level systems in the sanitary tanks of ships and submarines, borated water tanks, chemical tanks, flow measuring systems and pressure drop-across filters, pumps, etc.

Figure 5:
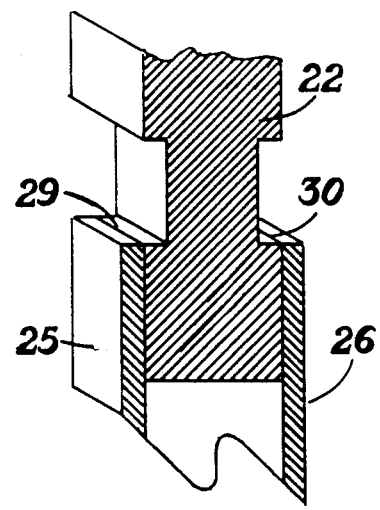
FIG. 5 is a section taken along the line BB of FIG. 2 to again show the welding of the diaphragms.

FIG. 2 shows a front view of the probe portion of FIG. 1. The probe 22 is welded at 23 to the adapter 24. FIG. 3 shows the diaphragms 25 and 26 which are welded to the plate 22 as shown in FIGS. 4 and 5, FIG. 4 being a section taken at AA in FIG. 2 to illustrate how the plate 22 is welded to the diaphragm 25 and 26. FIG. 5 shows the welding at the cross section BB of FIG. 2 to the plate 22 of diaphragms 25 and 26 at points 29 and 30.

Figure 6:
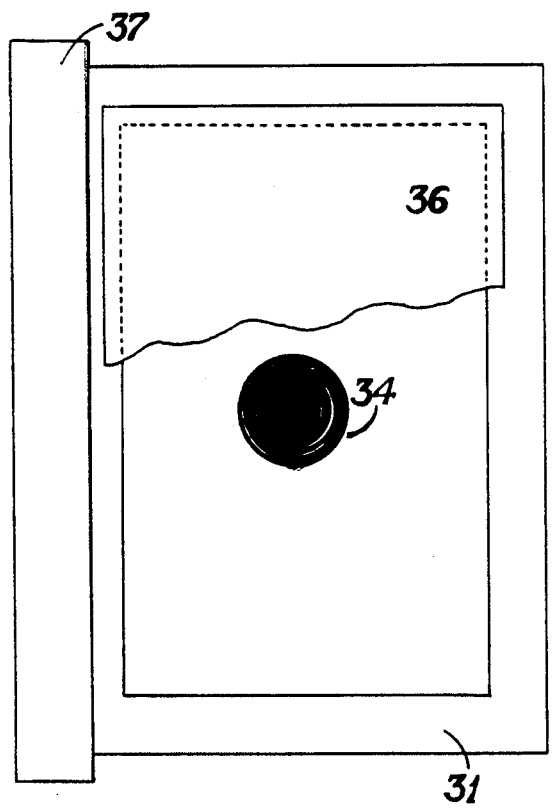
FIG. 6 is a side view of such a probe using a bluff body with a portion of the diaphragm seal broken away to show a piezoelectric sensor.
Figure 7:
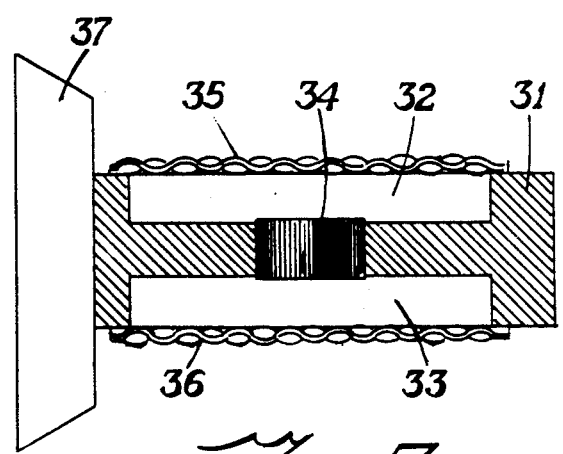
FIG. 7 is a top view of FIG. 6 to show a two cavity configuration.

As illustrated in FIGS. 6 and 7 the probe may be designed with a dividing wall 31 between two cavities 32 and 33. A piezoelectric sensor 34 is illustrated positioned in the dividing wall 31. Diaphragms 35 and 36 close off cavities 32 and 33. Cavities 32 and 33 are liquid filled and are connected by means of the piezoelectric sensor 34 to sense the differential pressure therebetween. The cavities could also be connected alternatively by means of two liquid filled capillary tubings to a differential pressure device. When placed in a flowing fluid the probe may be positioned to generate hydraulic pressures that are functions of fluid velocities. For example, if the probe 31 is placed with one diaphragm facing the flow the fill liquid will develop a hydrostatic head of $+\rho V^2$. The reverse diaphragm will develop an equal pressure but of the opposite value. This differential pressure function is similar to pivot tubes. To reduce friction and obstruction losses the probe may be positioned at various angles relative to the flow stream. This may be useful in contaminated flows such as coal slurry.

Additionally, a bluff body nosepiece is illustrated in FIGS. 6 and 7. With such a nosepiece a two cavity probe will sense the downstream distributions created by the vortex trails when the nosepiece is positioned upstream.

Since the principles of the invention have now been made clear, modifications which are particularly adapted for specific situations without departing from those principles will be apparent to those skilled in the art. The appended claims are intended to cover such modifications, as well as the subject matter described and to only be limited by the true spirit of the invention.

What is claimed is:

1. A diaphragm probe comprising a plate having a portion removed to form a cavity, two diaphragm strips are sealed one to each side of said cavity, a capillary tubing connecting said cavity to a pressure sensitive instrument and an incompressible fluid filling said cavity of said capillary in order to transmit pressure changes at said diaphragms to said instrument; and an adapter extending from one end of said plate and having a top plate adjustable therealong to position said probe in a conduit and a cover attachable to said top plate for extending downward over said plate to protect it while at the same time having apertures therein so that the surrounding pressure can reach said probe plate and diaphragms.

2. The probe of claim 1 in which said plate and diaphragm strips are generally rectangular.

3. The probe of claim 1 in which said plate has two portions relieved to form two opposing cavities with a dividing wall therebetween, a capillary is connected from each of said cavities to the two sides of a differential pressure measuring instrument, said probe being capable of being positioned in a flowing fluid to generate hydraulic pressures which are a function of fluid velocity.

4. The probe of claim 3 in which one of said diaphragm is positioned facing fluid flow in said conduit with the other of said diaphragms positioned away from said fluid flow whereby said one diaphragm will develop a hydrostatic head of $+\rho V^2$ and said other diaphragm $-\rho V^2$ to yield a measurement of $2\rho V^2$ in said differential instrument.

5. A diaphragm probe for use in a flowing fluid comprising:

a generally rectangular plate having two portions relieved to form two opposing cavities with a dividing wall therebetween;

a piezoelectric sensor in said wall extending so as to be exposed to each of said cavities;

two generally rectangular diaphragms sealed one to each open side of said cavities;

an incompressible fluid filling each of said cavities; and said sensor sensing the differential pressure between said cavities caused by said fluid.

6. The probe of claim 5 including a bluff body nosepiece positioned at one end of said plate, said sensor sensing the differential pressure between said cavities due to the downstream distributions created by the vortex trails when the nosepiece is positioned upstream in the flowing fluid.

* * * * *